Figure 1:
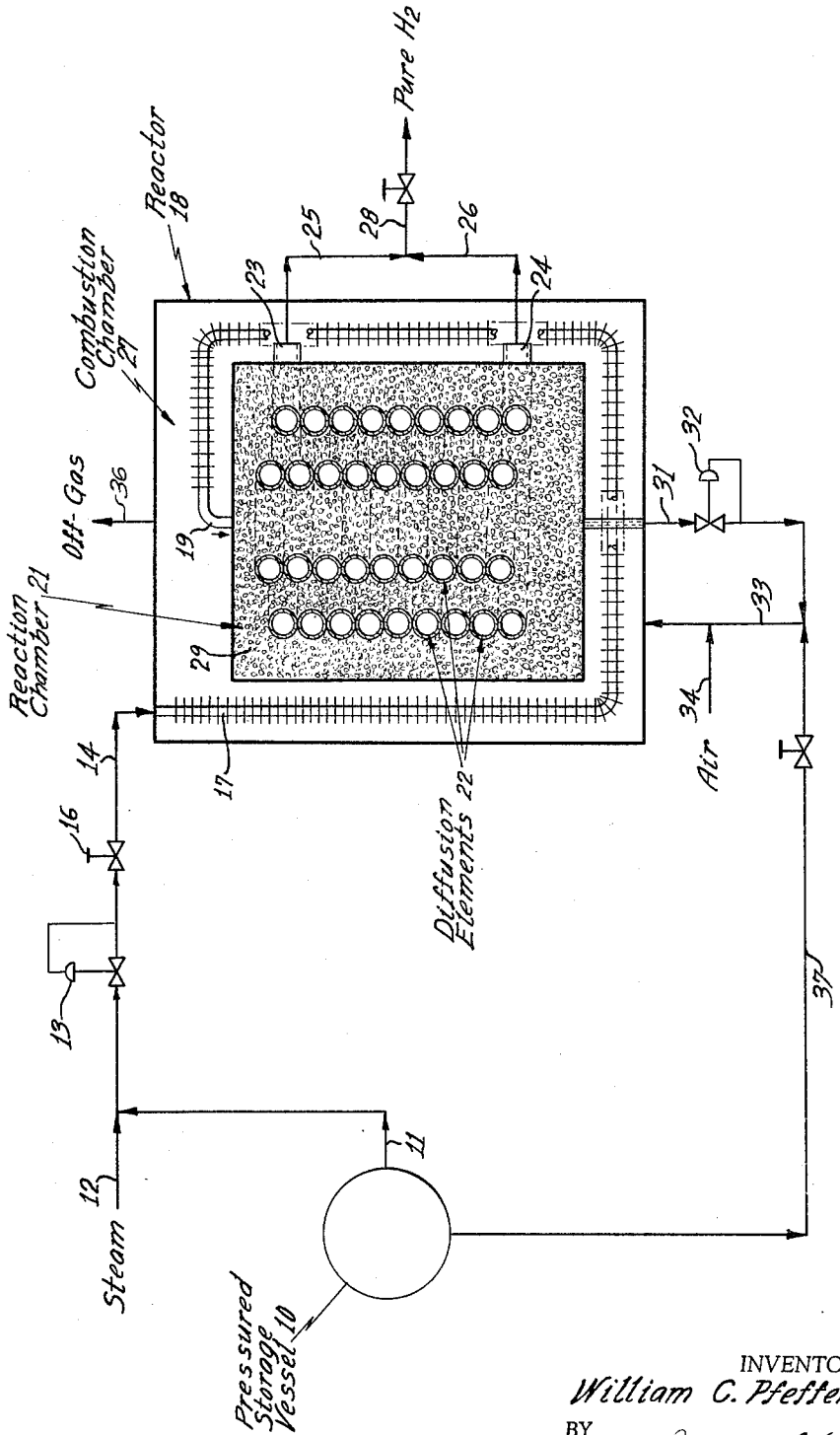

Oct. 11, 1966   W. C. PFEFFERLE, JR   3,278,268
METHOD FOR HYDROGEN PRODUCTION
Filed Aug. 15, 1962   2 Sheets-Sheet 1

INVENTOR.
William C. Pfefferle, Jr.
BY
Samuel Kahn
ATTORNEY

Oct. 11, 1966  W. C. PFEFFERLE, JR  3,278,268
METHOD FOR HYDROGEN PRODUCTION
Filed Aug. 15, 1962  2 Sheets-Sheet 2

INVENTOR.
William C. Pfefferle, Jr.
BY Samuel Kahn
ATTORNEY

United States Patent Office 3,278,268
Patented Oct. 11, 1966

3,278,268
METHOD FOR HYDROGEN PRODUCTION
William C. Pfefferle, Jr., Middletown, N.J., assignor to Engelhard Industries, Inc., Newark, N.J., a corporation of Delaware
Filed Aug. 15, 1962, Ser. No. 217,012
7 Claims. (Cl. 23—212)

This invention relates to methods and apparatus for the production of hydrogen. More particularly, the invention concerns novel methods for the generation of hydrogen in compact generating apparatus which can be readily designed as a self-contained hydrogen generator useful in conjunction with commercial and industrial processes to supply instant hydrogen. The invention is also concerned with methods for generation of hydrogen of sufficient purity to serve as a fuel supply for hydrogen-oxygen fuel cells for the production of electricity and finds particular application in the design and fabrication of shipboard or submarine units for such usage.

Numerous chemical conversions are known to the prior art for the production of gas streams containing hydrogen which can serve, provided the hydrogen-containing stream is freed of associated impurities, as sources of hydrogen for fuel-cell utilization. Among such conversions are well known industrial processes for the reaction of solid carbonaceous or gaseous or liquid hydrocarbon feed stocks with steam and/or oxygen to produce mixtures of carbon monoxide and hydrogen. Such processes provide a hydrogen-containing gas mixture which requires considerable purification prior to use as a fuel cell feed, particularly for removal of traces of carbon monoxide which is a potent poison for catalysts normally employed in fuel cell electrodes. In the utilization of such processes for the economic production of hydrogen, careful attention must be given to the overall heat balance and heat requirements of the hydrogen-generating reaction, since economy of heat utilization is essential to reasonable hydrogen cost. This factor is particularly important when it is desired to produce a compact integral unit for hydrogen generation suitable for laboratory, industrial, shipboard or submarine usage, etc. In such applications, economy of operation and compactness of design require that complex heat exchangers and condenser systems be eliminated because of limited space availability.

It has hitherto been proposed that steam reforming reactions be employed as a method for production of hydrogen suitable for fuel-cell usage. In the practice of such a process, gaseous or liquid hydrocarbons are first admixed with steam, heated in a heat exchanger to elevated temperature and passed to a reforming furnace. In the furnace, the mixture of gas passes down through tubes packed with a suitable catalyst where methane or other hydrocarbon content is reformed to obtain a mixture containing hydrogen and carbon monoxide. Since the reforming reaction is endothermic, sufficient heat for the reaction must be supplied by combustion in the furnace. In one method of commercial practice, oxygen, in an amount necessary to provide the required heat by combustion of feed, is added to the gas steam mixture prior to reforming. Reformed gas leaving the converter has a relatively high carbon monoxide content, typical reform mixtures containing 10% $CO_2$, 15% CO, 73% $H_2$ and 2% inerts ($CH_4$ and $N_2$).

Conventionally, the effluent from the steam reforming converter is subjected next to a CO shift reaction for the conversion of the CO content thereof to $CO_2$ and additional hydrogen. Reaction conditions employed in the shift converter are entirely different, in particular as to temperature, than are encountered in the reforming reactor. Thus, while the reformer is conventionally operated at temperatures of 1500°–1800° F., the CO shift is usually operated at a far lower temperature, e.g., 700–900° F. Further, while the reforming reaction is endothermic, and thus must be supplied with heat, the shift reaction is exothermic, and provision must be made to remove the reaction heat in order to maintain desirably low temperatures which favor the conversion of CO to $H_2$. As is well known, the catalysts in the reformer usually contain nickel oxide while the shift reaction normally employs an iron oxide catalyst.

In order to provide ultra-pure hydrogen, it has been proposed that the effluent from a typical reformer-shift reactor process be contacted with one side of a diffusion barrier such as a palladium or palladium alloy membrane to separate pure hydrogen from an undiffused gaseous reaction mixture.

In accordance with the process of the present invention, gaseous or liquid hydrocarbon in admixture with steam is contacted with a steam reforming catalyst at elevated temperature to produce a reaction mixture containing hydrogen and carbon monoxide, hydrogen is separated from the thus formed reaction mixture by diffusion means, and heat is supplied to the reforming reaction zone by combustion of the undiffused gaseous products of the reforming reaction containing CO and undiffused hydrogen. In accordance with this method, it is possible to operate at milder conditions with resultant incomplete conversion since use is made of residual heat values. By only partially withdrawing the hydrogen from the reaction mixture produced by the steam reforming reaction, a relatively high diffusion rate is obtained. The amount of $H_2$ withdrawn may range broadly from about 20 to about 75% of that produced, or even higher, e.g., up to about 90% of the hydrogen formed. For example, in a stand-by operation, little or no hydrogen need be withdrawn. In relatively large size units (e.g., delivering about 500 cu. ft./hr. of hydrogen, or larger) about 90% of the $H_2$ can be withdrawn, depending upon the reforming efficiency. In small units, heat losses require that a substantial amount of $H_2$ be left in the residual gas, in some cases as much as 30–50%. A large amount of residual $H_2$ means that relatively small diffusion elements can be used because the $H_2$ partial pressure is relatively high.

In a preferred embodiment of the present invention, hydrogen diffusion through hydrogen-permeable membranes is employed for removal of hydrogen during the course of the reforming reaction to separate, either continuously or intermittently, a pure hydrogen stream from an undiffused reaction mixture, and to thus promote the formation of additional reaction product by further conversion of hydrocarbon in the gaseous reaction mixture. By reducing the hydrogen concentration in the gas mixture undergoing reaction, the overall equilibrium for the reforming reaction is shifted toward formation of additional reaction product, i.e., CO, $CO_2$ and hydrogen. As a result, a more complete conversion of hydrocarbon feed is obtained than could be realized in the absence of hydrogen removal during the course of the reforming reaction under similar reaction conditions. The principles and advantages of diffusion separation of hydrogen during reaction such as steam reforming of hydrocarbons is more fully described in my copending application Serial No. 196,552, filed May 15, 1962, and now abandoned.

An important feature of the present invention is the utilization of the undiffused gases separated from the reforming reaction zone as a source of heat for satisfying the heat requirements of the endothermic hydrocarbon-steam reforming reaction. Such undiffused off-gases are burned with oxygen or air, preferably by burning the gases in admixture with oxygen-containing gas in a combustion chamber disposed adjacent to, within, or surrounding, the reforming catalyst zone so as to maximize the overall heat conversion and to reduce the heat loss to a minimum. A combustion catalyst can be employed in the combustion chamber, but where sufficient hydrogen is present in such undiffused off-gases to be within the flammability limit of $H_2$ in air, i.e., about 15% or more $H_2$, it is not necessary to use a combustion catalyst. On being ignited, the $H_2$ will continue to burn. By utilizing the undiffused gases as fuel for the reforming reaction, particularly where a unitary reforming-diffusion zone is employed to maximize hydrogen production at the lowest possible temperatures, high overall efficiency of the process, both in terms of heat balance and hydrocarbon conversion, is readily realized.

Steam reforming of gaseous or liquid hydrocarbons, e.g., methane, propane, naphtha and the like, is favored by high temperature. For example, for the reaction $CH_4 + H_2O$ (steam) $\rightarrow CO + 3H_2$
$K_p$ at $1100°$ F.$= 0.4098$
$1200°$ F.$= 2.679$
$2200°$ F.$= 1.784 \times 10^5$, $K_p$ being the equilibrium constant based on partial pressure at the given temperature expressed in the conventional manner.

Conventional methods for reforming of methane or natural gas, the major component of which is methane, usually operate at a temperature of 1500° to about 1800° F. to maximize the conversion to hydrogen in accordance with the equilibrium constants shown above. Such equilibrium reactions are pressure limited, and the formation of hydrogen is favored at lower operating pressures. At any given pressure, the formation of large quantities of hydrogen, e.g., 3 mols for every mol of $CH_4$ converted, limits the amount of $CH_4$ which can theoretically be converted to the desired product. This effect is even more pronounced in the case of higher hydrocarbons such as propane, kerosene and naphtha, where even greater molar ratios of hydrogen to hydrocarbon are produced by reaction with steam. Removing hydrogen from the reaction zone can drive the reaction toward completion at ordinarily less favorable lower temperatures. For example, operation of a reforming process in an integral reaction-diffusion zone, wherein $H_2$ is continuously removed from the reaction mixture, makes it feasible to operate at temperatures of 1000°–1200° F. in spite of the indicated unfavorable equilibrium constant $K_p$ at such temperatures. Concomitant savings in capital costs and operating costs are thus achieved and, importantly, heat losses are radically reduced thus making possible more efficient units. The utilization of hydrogen diffusion makes possible use of undiffused gas as fuel. A reduction in heat losses for the overall process is a result of such use, since the full fuel value of the carbon monoxide is utilized, in contrast to conventional processes in which the exothermic heat of the CO shift to $CO_2$ and $H_2$ (which is ordinarily effected at 700–900° F.) is unavailable to the steam reforming step which ordinarily requires an operating temperature in excess of 1500° F. The design of an integral self-sustained hydrogen generating unit is thus possible by use of a diffusion unit in combination with combustion of residual undiffused gases.

The method of this invention is applicable to processes involving the steam reforming of gaseous or liquid hydrocarbons at temperatures between about 1000° F. and about 1800° F., and pressures between about 2 and about 100 atmospheres, or even higher, e.g., up to about 300 atmospheres. Generally, pressures between about 10 and about 70 atmospheres are preferred.

According to the present invention, gaseous or liquid hydrocarbons are contacted with steam in a reforming reaction zone and hydrogen is removed from the gaseous reaction products by diffusion through hydrogen-permeable membranes. As shown above, by such removal of hydrogen from the reaction zone, it is possible to use lower temperatures and higher pressures to realize essentially the same percent conversion normally achieved in operating by prior art methods. As a result, heat requirements are lower. Also, the need for a compressor for effecting hydrogen diffusion is eliminated. Although units can be designed to convert the hydrocarbon feed to any desired extent, because of high capital costs it may be more advantageous to reduce the cost of the equipment rather than to achieve more efficient conversion. Using the method of this invention, it is possible to use less expensive materials and simpler and less expensive equipment for the production of hydrogen from an integral, self-contained and portable operating unit.

In units, particularly small portable units, where the primary concern is not the complete conversion of hydrocarbon feed, but the size, weight and self-containment of the system, it is often more advantageous to separate the reforming and diffusion processes. This can help to reduce the weight of the unit by minimizing the amount of catalyst required and the size of the unit by minimizing the surface area of the diffusion element. In a system in which complete conversion of the hydrocarbon is not sought, it is possible to maintain a higher differential in partial pressure of the hydrogen across the diffusion element if the diffusion element is not integral with the steam reforming catalyst bed.

The process of the present invention can be effected in any apparatus of the type generally used for conducting chemical reactions, such apparatus being provided with suitable hydrogen diffusion elements to provide for separation of a diffused hydrogen stream from the reaction mixture during the course of the steam reforming reaction.

For example, a compartmented reactor can be employed which reactor contains a reaction chamber and a diffusion chamber, the diffusion wall of the diffusion chamber being composed of a non-porous metal permeable to hydrogen. Such diffusion chamber may consist of tubular elements of hydrogen-permeable materials, such as straight or coiled tubes of palladium or palladium alloy construction, or may comprise compartments having one or more walls of hydrogen-permeable foil or film. Where such foils are employed, there may be supported or backed by suitable rigid, porous materials to provide structural characteristics necessary to resist deformation due to pressure differences between the reaction chamber and the diffusion chamber. Integral with the reaction chamber and in indirect heat exchange relationship therewith, is provided a combustion chamber, in which undiffused gases from the reactor are burned to provide heat necessary to maintain the endothermic steam reforming reaction.

Palladium and palladium alloys have been found to be particularly suitable materials for the walls of the diffusion chambers, e.g., palladium-silver alloys of the type disclosed in U.S. Patent No. 2,773,561. Such materials provide rapid diffusion of essentially completely pure hydrogen, the diffusion gas having less than 1 part per billion (p.p.b.) impurities. Palladium and its alloys are particularly useful in the process of the present invention since hydrogen diffuses through these materials at realistic commercial rates at temperatures ranging from about 400° F. to 2000° F. The upper temperature limit is dictated by strength considerations of the unit being used, which is a function of the particular design and materials of construction. Other metals permeable to hydrogen, e.g., platinum and its alloys, can be employed.

The process effected according to the present invention can be conducted at atmospheric or super-atmospheric pressure, and the design of the diffusion unit is readily adapted to operation under varying conditions of pressure. Where the reaction is effected at super-atmospheric pressure, the walls of the diffusion chamber can be made of sufficient strength to withstand such pressures, for example, pressures up to 500 p.s.i.g. and even 1000 p.s.i.g. Desirably, the walls are designed to provide minimum thickness consistent with maximum desirable pressure differential across the diffusion membrane, since $H_2$ diffusion is a function of both pressure differential and wall thickness in a diffusion process. Advantageously, wall thickness can be kept to a minimum by providing sweep gas within the diffusion chamber at a pressure which can be adjusted to provide desirable differential pressure without collapse of the chamber wall.

The hydrocarbon employed in the practice of the present invention may comprise the natural gas hydrocarbons such as methane, ethane, propane and the butanes, as well as mixtures thereof. These hydrocarbons may also be in admixture with hydrogen as in reforming tail gas. Other hydrocarbons suitably may be employed such as the liquid hydrocarbons boiling in the gasoline, kerosene and gas oil boiling ranges. For example, liquid hydrocarbon distillates boiling up to about 750° F. may be satisfactorily employed.

Suitable catalysts for the production of hydrogen by catalytic steam reforming of hydrocarbon feeds are well known and, in general, should possess high activity and good physical strength. Oxides or metals of the iron group, admixed with aluminum oxide, form desirable catalysts. Calcium and magnesium oxides and silica may be added to secure catalysts of greater strength at higher temperatures. Especially suitable catalysts comprise supported nickel oxide, e.g., nickel oxide on alumina or phosphoric acid-alumina-nickel oxide. A suitable catalyst is prepared from nickel oxides, magnesia and kaolin. The catalyst is usually prepared in the form of a paste, cut into small cubes and dried slowly. It is then heated slowly, advantageously in the presence of steam, to a temperature equal to or up to 500° F. higher than the operating temperature for reforming use, and then roasted at this temperature for about 24 to 48 hours. Dried catalyst is employed in cube or particulate form, the latter being preferred when the catalyst is employed in a reaction zone containing embedded hydrogen diffusion members.

In the practice of the present invention, the effluent from the reforming reactor, after being depleted in hydrogen by contacting with a hydrogen-permeable membrane, and consisting of carbon dioxide, carbon monoxide, residual hydrogen and some unreacted hydrocarbon, is mixed with oxygen-containing gas and burned in combustion chambers which are incorporated into the reforming reactor in order to supply the necessary heat for the reforming reaction. The hot effluent combustion gases from the reforming reactor are utilized to preheat the input stream. A hydrogen-generating unit based upon the present invention may, for example, be employed as a source of hydrogen fuel for fuel cell use in submarine power systems, and in such case, combustion air may be provided during surface operation of the submarine, or suitably diluted oxygen withdrawn from liquid oxygen storage in underseas operation.

The steam requirements of the steam reforming reaction may be met by separation of product water from the combustion by condensation, and recycle of such condensate to the reforming reaction zone. Where the hydrogen generator supplies hydrogen feed to a hydrogen-oxygen fuel cell, steam obtained from the fuel cell is advantageously returned to the reforming process cycle, thus providing marked economic advantages and efficient utilization of all heat generated in the system. Carbon dioxide can be liquefied and stored as ballast for the liquid oxygen consumed, in submerged operation, while residual off gases—carbon dioxide and nitrogen—formed when air is employed for the combustion during surface operation of the submarine (or in ordinary shipboard usage), would be vented directly instead of being stored. Generally, there is employed from about 1 to about 10 moles of steam per atom of carbon introduced as hydrocarbon to the reformer. In a unitary reactor-diffusion separator of the type disclosed herein, it has been found that steam utilization is highly efficient, and only a small excess of steam over that theoretically required to convert all of the carbon to $CO_2$ is needed. In such operations, as little as 10% excess steam is effective, i.e., about 2.2 moles per atom of carbon, and generally from about 1.5 to 4 moles of steam per atom of carbon is preferred.

Figure 2:
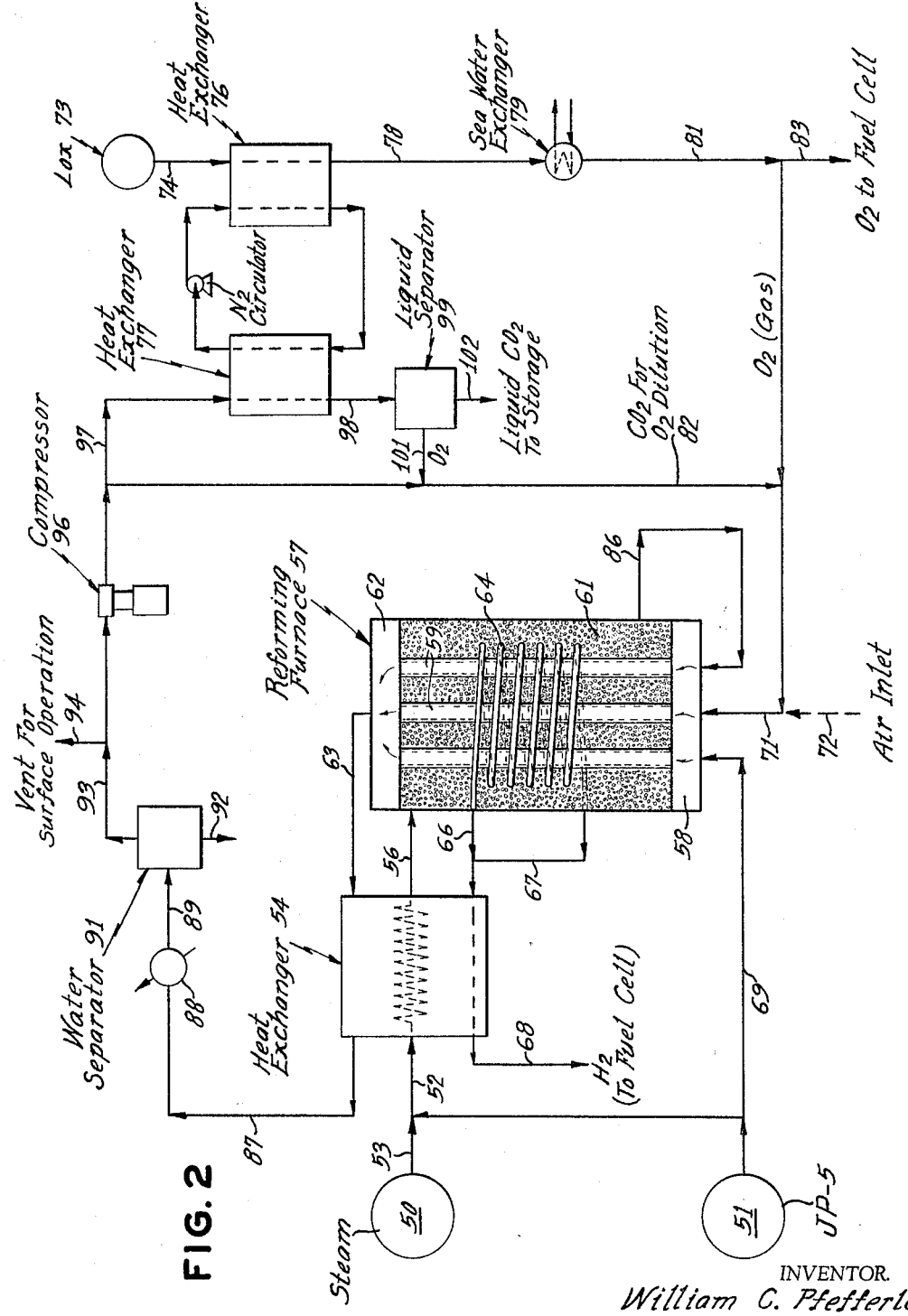

Specific features and advantages of the invention will become apparent from a consideration of the following detailed description and from the drawings, in which:

FIGURE 1 is a flow-sheet showing in schematic form method and apparatus for effecting the process of the invention; and FIGURE 2 shows in schematic form an integrated system for utilizing the invention for production of hydrogen feed for fuel cell operation in a submarine or shipboard unit.

In accordance with the invention, there is provided a reservoir of hydrocarbon feed, a reactor containing a catalyst active for steam reforming of hydrocarbons such as a supported nickel oxide catalyst, and a palladium alloy diffusion coil to withdraw the hydrogen from the hydrocarbon reformate. The reforming unit is heated by combustion of residual gases, including undiffused $H_2$, CO and any unconverted hydrocarbon (or hydrocarbon products by reforming such as methane) removed from the reformer. By only partially withdrawing the hydrogen from the reformer gas effluent, e.g., about 50% of that produced, a relatively high diffusion rate through the palladium alloy membrane is obtained. The heating of the reforming unit is carried out countercurrently so that the heat of the combustion gas is utilized to preheat the hydrocarbon feed to the reformer and the total hydrocarbon consumption is kept at a minimum.

The heat required for the start up of the unit is obtained by combustion with air of hydrocarbon fuel, which is advantageously the same as the hydrocarbon feed to the steam reformer and can be injected into the combustion chamber of the unit through a special feed line. Combustion at start-up provides for initial heating of the catalytic reactor to the desired steam reforming temperature of the order of 1000°–1400° F. The start-up temperature can be provided in other ways, e.g., by electrical heating or by application of heat from any external source. Upon starting the generator, the hydrogen produced by steam reforming of the hydrocarbon feed will diffuse through the palladium alloy tubing and become available for use as, for example, in a fuel cell, and combustion of undiffused gases from the reactor will provide necessary heat to support the cracking reaction.

Referring to FIGURE 1, a pressured storage vessel 10 is provided with an exit line 11 for discharge of kerosene or other liquid hydrocarbon feed. Steam from suitable source (not shown) is introduced by line 12 to line 11 and the mixture of steam and kerosene at the desired pressure is introduced by line 14 to preheater 17 in reactor 18. Pressure regulator 13 in line 14 provides feed at any desired pressure, for example from about 2 atmospheres to about 100 atmospheres. Manual valve 16 is of the open/closed type and is advantageously used in starting up or closing down operation without the need for varying the setting of pressure regulator 13.

Preheater 17 consists in the present example of a finned conduit positioned within combustion chamber 27 of reactor 18, but may of course be separate from the reactor or otherwise disposed within the reactor to provide for preheating of the kerosene-steam feed by means of combustion heat developed as hereinafter more fully described.

Preheated feed is introduced to inner chamber 21 of reactor 18 by line 19. Within chamber 21 are disposed diffusion elements 22 defining a diffusion chamber which in the present example are tubular elements composed of palladium-25% silver alloy. The ends of the diffusion elements 22 terminate in headers 23 and 24 from which hydrogen which diffuses into the diffusion chamber is passed by lines 25 and 26 to valved line 28. The diffusion elements may be of such design and configuration shown and described in U.S. Patent 2,911,057. Pure hydrogen produced in the reactor is withdrawn from line 28 for utilization as fuel in associated fuel cell (not shown) or for other purposes.

Diffusion elements 22 disposed within the reaction chamber 21 are surrounded by solid particulate steam reforming catalyst 29 which is effective in providing the steam reforming of hydrocarbons such as propane to a mixture of CO and $H_2$. Such catalysts are well known to the art, and for the purposes of the present example, nickel oxide supported on alumina is employed as the catalyst. Annular jacket 27 which is defined by the inner wall of reactor 18 and outer wall of chamber 21 defines a combustion zone in which residual gases, after being depleted in hydrogen, are burned to provide heat for maintaining the reforming reaction. Such undiffused gases exit chamber 21 by line 31, provided with pressure control valve 32 to control the pressure within chamber 21 and are passed by line 33 into combustion chamber 27, being admixed with air or other oxygen gas introduced by line 34. Combustion of these gases in chamber 27 provides heat for maintaining the catalyst bed at the desired reforming temperature, and provides necessary heat for preheating feed in exchanger 17. Combustion products exit the reactor by line 36 for discharge to the atmosphere or other suitable means of disposal. Combustion chamber 27 may contain a combustion catalyst (not shown) for effecting the flameless combustion of residual hydrogen in the residual undiffused gases, e.g., a supported platinum group metal catalyst such as platinum, palladium, ruthenium, rhodium, etc., supported upon an inert particulate support such as alumina, zirconia or similar refractory support. Such combustion catalysts are well known in the art.

In starting-up operations, valved line 37 is provided to permit initial addition of hydrocarbon as fuel to the combustion chamber. In starting the generator, combustion of fuel introduced by line 37 (in admixture with air or oxygen added by line 34) is effected until the desired reaction temperature is reached in reforming chamber 21. The residual gas, i.e., the undiffused gas may contain unreacted or partially reacted hydrocarbons as well as CO, $H_2$, $CO_2$ and $H_2O$. Thereafter, hydrogen, CO unreacted and partially reacted hydrocarbons produced in the reforming reaction provide sufficient heat to maintain the desired reaction conditions. Under standby conditions, no hydrogen need be withdrawn from the diffusion chamber. During operation of the unit, a portion of the generated hydrogen diffuses through the palladium alloy tubing, and the remainder of the hydrogen, together with other combustible products of the reforming reaction, are burned to provide heat for maintaining the reaction.

The hydrogen generator described above can employ either gaseous or liquid hydrocarbons as feed. The generator can employ methane, natural gas, liquid propane, kerosene, jet fuel, naphtha and the like as hydrogen source. The design of a generator for utilization of a particular feed would be generally the same as described above, any differences consisting in details of the feed supply and start-up means. Thus, the use of propane as feed would permit operation at temperatures as low as 18–19° F. (vapor pressure of propane 35 p.s.i.g.). In the case of kerosene, the flow of feed can be provided by compressed air, the air pressure being generated either by hand pump (at low pressure) or by means of compressed air admitted through an air valve from a source of compressed air.

It is also within the scope of the invention to provide various alternative means for introducing needed water to the system. For example, a feed consisting of an emulsion of water and hydrocarbon, e.g., kerosene, may be used as feed in lieu of separately introducing water or steam.

Referring to FIGURE 2, a source of steam 50 and a source of hydrocarbon fuel, for example JP-5 (kerosene), 51, are provided. The fuel in admixture with steam introduced by line 53 is passed by line 52 to heat exchanger 54 wherein the feed is heated by indirect heat exchange with combustion gases produced in reforming furnace 57. Reforming furnace 57 may be of any suitable construction which provides a reforming chamber suitably charged with reforming catalyst and combustion chamber. As shown in the figure, combustion is effected in header 58 and hot combustion gases pass through furnace tubes 59 within the reforming furnace to provide heat for the reforming reaction by maintaining the catalyst 61, within the furnace, at the desired reaction temperature. Hot combustion gases pass from collector 62 by line 63 to heat exchanger 54, where residual heat of the combustion gases is used to preheat the hydrocarbon-steam feed to the furnace.

Returning to the reforming furnace 57, there are provided, within the furnace, diffuser coils 64 which may be of palladium or palladium alloy construction, typically palladium-silver, and which define a diffusion chamber for removal of hydrogen from the reformate produced in furnace 57. The hydrogen diffusion coils are embedded in, and surrounded by reforming catalyst 61 which in commerical practice is a typical steam reforming catalyst such as nickel oxide on alumina, or any other suitable particulate steam reforming catalyst. Hydrogen produced in the reforming furnace, and separated by diffusion into coils 64, passes by lines 66 and 67 to hydrogen product line 68 for utilization as feed to a fuel cell. Maximum utilization of heat generated in the process is achieved by contacting product hydrogen in indirect heat exchange relationship with feed, for example, in exchanger 54, as shown in FIGURE 2.

In starting-up operation, hydrocarbon fuel from source 51 is directly introduced by line 69 to combustion chamber 58, where the fuel is burned in admixture with air or oxygen introduced by line 71. In shipboard operation, or surface operation of a submarine, air is introduced to line 71 by line 72. In use in submerged condition, a source of liquid oxygen 73 is provided from which liquid oxygen passes by line 74 to heat exchanger 76 where a liquid nitrogen heat exchange is provided for cooling waste gases in exchanger 77. Gaseous oxygen passing from heat exchanger 76 by line 78 is further warmed in exchanger 79, and passes by line 81 to line 71 for use as combustion gas. In certain instances, it may be desirable to effect combustion with diluted oxygen, and line 82 is provided for addition of $CO_2$ to combustion $O_2$ stream for dilution purposes. Oxygen gas is withdrawn from line 81 by line 83 for use as the oxidant in associated fuel cell (not shown).

When reforming reaction temperature has been reached in furnace 57, auxiliary fuel supply line 69 is shut, and a mixture of fuel and steam is fed to the furnace by line 56. Steam reforming of the feed generates a mixture of CO, $H_2$, $CO_2$, $H_2O$, unreacted and partially reacted hydrocarbons (primarily $CH_4$) in the furnace, a portion of the hydrogen being continuously withdrawn from line 68. The remainder of the hydrogen, together with CO and other reformer products, passes by line 86 to combustion zone 58 and serves as fuel for maintaining the desired reaction temperature. The particular conditions employed, as well as the flow rates of feed and steam, can be suitably adjusted to provide any desired output of pure hydrogen, and the entire reactor can be suitably insulated to provide maximum thermal efficiency. Where high output of hydrogen is desired, and the amount of residual $H_2$ and other combustibles in the undiffused gas is insufficient to provide thermal balance, auxiliary heat can be provided by burning fuel introduced by line 69.

Hot combustion gases which exit the reactor by line 63 are passed through heat exchanger 54 as previously described, and enter cooler 88 by line 87, where the gases are sufficiently cooled to condense a major portion of the contained water. Cooled combustion gases pass by line 89 to water separator 91 from which condensate is removed by line 92. Uncondensed gases, mainly $CO_2$, pass by line 93 to vent 94 for disposal to the atmosphere in surface operation. If desired, and particularly in underseas operation, $CO_2$ passes by line 93 to compressor 96, and compressed $CO_2$ is introduced by line 97 to heat exchanger 77 for further cooling and liquefication by indirect heat exchange with liquid $N_2$ circulated from exchanger 76. A portion of the compressed $CO_2$ gas may be withdrawn from line 97 by line 82 for use as combustion oxygen diluent. Liquid $CO_2$ produced in exchanger 77 passes by line 98 to separator 99 where uncondensed gas, mainly $O_2$, is separated by line 101 and can be recycled to combustion by addition to $CO_2$ diluent in line 82. Liquid $CO_2$ passes from separator 99 by line 102 to storage, and may, for example, be used to replace liquid oxygen used up in the process.

From the above description, it will be seen that a simple, thermally efficient, and highly compact hydrogen-generating system is provided by the process of the present invention. On an over-all basis, the hydrogen yield from a specified amount of fuel does not depend on catalyst activity and process variables such as temperature and pressure, but only on the efficiency of minimizing heat losses. An excess amount of catalyst can be provided in the system to compensate for changes of catalyst activity. The choice of operating pressure will be dictated by the specification for delivery pressure of the hydrogen product. This condition is determined by the hydrogen partial pressure driving force necessary for diffusion.

The hydrogen generators described herein produce a pure grade of hydrogen. This feature makes the generator adaptable to any kind of fuel cell. Furthermore, since the system utilizes the residual portion of the hydrogen from the steam reformate to provide the heat of cracking, there is no penalty for producing pure hydrogen.

Excess heat available from the effluent gases of the hydrogen generator can be further utilized by a compact arrangement of generator and fuel cell, in those cases where fuel cell operation is desirable at elevated temperature. Various other expedients for maximizing the thermal efficiency of the overall hydrogen generating system will be apparent to those skilled in the art.

*Example I*

A stainless steel tubular reactor, 5/16" in diameter and 20⅝" length, was fitted with a 9" length of palladium-25% Ag tubing, 1/16" diameter and 3-mil wall thickness. The Pd-Ag tubing served as the hydrogen diffusion element. The diffusion tubing was sealed at one end and at the other end was welded to a ⅛" stainless steel tube. The stainless steel tubing served as the exhaust conduit for the diffused hydrogen and was fitted in an appropriate leak-proof manner. The diffusion element was integral with the reaction zone and positioned in the catalyst bed. The catalyst was a commercial nickel reforming catalyst and the feed propane.

For operation of the diffusion element, a suitable valve was installed which when opened permitted the diffused hydrogen to bleed off from the system. A gauge in the line measured the pressure in the diffusion tube and thus permitted measurement of hydrogen partial pressure in the reaction zone when no hydrogen was being withdrawn.

The system was leak-checked at operating pressure using a nitrogen stream initially, before propane and steam were fed to the unit and after the completion of each set of comparison tests. Comparison tests were run at 1300° F. (furnace temperature), and at 1470° F. (furnace temperature).

The propane-steam feed was passed downward through the catalyst bed which consisted of 8.52 g. of nickel reforming catalyst, occupying 8 inches of reactor length. The catalyst completely surrounded the diffusion element for a length of about six inches.

In the conventional runs without separation of hydrogen the quantity of off-gas from the reactor was determined and the content was analyzed for CO, $CO_2$, $H_2$, $H_2O$ and $C_3H_8$ using standard techniques. The $CH_4$ content was calculated by difference. As indicated above, the diffusion unit was used to measure the partial pressure of hydrogen in the system.

In the runs using a hydrogen diffusion technique in accordance with this invention the flow of pure hydrogen evolving from the hydrogen diffusion unit was measured and the off-gas from the reactor was determined quantitatively and analyzed for content. In the indicated test, the $CH_4$ content of the off-gas was analyzed (as well as the CO, $CO_2$, $H_2O$, $H_2$ and propane content) in order to check on the accuracy of the determination. Good agreement was found between the calculated and analyzed value of the $CH_4$.

In Table I the composition of the reactor effluent for each run is shown. Gases with fuel value present in such effluents are CO, $H_2$ and $CH_4$. With the use of $H_2$ diffusion techniques the $H_2$ is separated out for use and the residual undiffused gas is used as fuel according to this invention. By having the $H_2$ diffusion unit in the reactor an improved $H_2$ yield can be effected.

TABLE I.—STEAM REFORMING OF PROPANE

| Run | Temp. Furnace (° F.) | Conditions | | Input | Reactor Effluent Expressed as Partial Pressures (p.s.i.) | | | | | | Diffusion Effluent | | Yields | |
|---|---|---|---|---|---|---|---|---|---|---|---|---|---|---|
| | | Temp. Reactor Outlet (Calc. Max.) (° F.) | Total Pressure (p.s.i.) | Mols [4] Steam/Mol Propane (Calc.) | Propane [3] | Steam | $H_2$ | CO | $CO_2$ | $CH_4$ | Percent Purity of $H_2$ | Percent of Total $H_2$ | $CO_2$/CO | $H_2$/mol C |
| Conventional-1 | 1,300 | 1,100 | 120 | 6.3 | 0 | 53.0 | [1] 29.4 | 2.5 | 12.1 | 23.0 | | 0 | 4.8 | 0.78 |
| $H_2$-Diffusion-2 | 1,300 | 1,120 | 125 | 7.6 | 0 | 65.1 | 22.7 | 1.9 | 13.4 | [2] 21.9 | 100 | 41 | 7.2 | 1.04 |
| Conventional-3 | 1,470 | 1,220 | 120 | 8.0 | 0 | 52.0 | [1] 38.1 | 4.8 | 12.2 | 12.9 | | 0 | 2.5 | 1.27 |
| $H_2$-Diffusion-4 | 1,470 | 1,170 | 120 | 6.5 | 0 | 44.5 | 36.3 | 6.3 | 16.8 | 16.1 | 100 | 40 | 2.7 | 1.54 |

[1] $H_2$ partial pressures were also determined by measurement of equilibrium pressure in diffusion unit where $H_2$ not bled off from system—measured and calculated values were in agreement.
[2] Partial pressure of $CH_4$ based on analysis of $CH_4$=21.2 p.s.i. as compared with 21.9 calc. by difference.
[3] 100% conversion of propane—Chromatographic analysis showed no propane in the effluent.
[4] Calculations based on output analyses.

The data show that even a small diffusion unit, such as used for the comparative tests, can be used advantageously. Such small units would be adequate for portable diffusion systems. The portable unit would consume the residual $CH_4$, CO and $H_2$ in the effluent as fuel to supply heat for the reforming reaction. For more efficient units the diffusion area can be increased to obtain the appropriate diffusion of $H_2$.

*Example II*

A stainless steel tubular reactor 1¾" in diameter and 24½" in length was fitted with a bundle of 30 tubes of 3-mil wall palladium-25% silver tubing, each tube having an outside diameter of 1/16" and being approximately 15" long. The palladium-silver alloy tubing which served as the diffusion element was embedded in and surrounded by commercial particulate nickel oxide reforming catalyst which filled the tubular reactor. Feed to the unit was propane and steam.

In operation, the propane-steam feed was passed downward at a pressure of 66 p.s.i.a. through the catalyst bed which in this example consisted of 277 g. catalyst. The reactor was positioned in a furnace and thermocouples placed at the inlet and outlet of the reactor end and at various points in the reactor to determine the bed temperature. During operation of the unit, maximum bed temperature was 1184° F. The results obtained are given in the following table.

TABLE II.—STEAM REFORMING OF PROPANE

[Temperature—~1140° F. (temp. near bottom of catalyst bed). Pressure—66 p.s.i.a.]

Input:
Reactor Effluent (Expressed as Partial Pressures):

| | |
|---|---|
| Mols steam/mol carbon (calc.) [1] | 2.3. |
| Propane | 0. |
| Steam | 25.6 p.s.i.a. |
| $H_2$ | 15.5 p.s.i.a.[2] |
| CO | 3.0 p.s.i.a. |
| $CO_2$ | 14.4 p.s.i.a. |
| $CH_4$ | 7.5 p.s.i.a. |

Diffusion Effluent:

| | |
|---|---|
| Percent of total $H_2$ | 68% |

Yields:

| | |
|---|---|
| Mols $CO_2$/mol CO | 4.8 |
| Mols $H_2$/mol C | 1.97 |

[1] Calculation based on output analyses.
[2] The $H_2$ partial pressure in the reactor effluent is shown to be a little above 1 atm.

While a furnace was used to provide the required heat for maintaining the reforming reaction in this example, it is clear that there is sufficient fuel value in the CO, $H_2$ and $CH_4$ in the reactor effluent stream to supply all or a substantial portion of the necessary heat to maintain the reactor bed at the indicated temperature.

*Example III*

The process of Example II is repeated except that the rate of removal of hydrogen from the diffusion element is controlled to provide a reactor effluent containing about 50% of the hydrogen produced in the reforming reactor. Reactor effluent is employed as fuel to the furnace surrounding the reactor. Thermally balanced operation is achieved without the necessity for employing auxiliary fuel sources to heat the reactor.

What is claimed is:

1. A process for the production of hydrogen which comprises contacting a mixture of steam and a hydrocarbon with a reforming catalyst in a reforming reaction zone at an elevated temperature to produce a gaseous reaction mixture containing hydrogen and oxides of carbon, contacting said gaseous mixture with one side of a non-porous metallic diffusion membrane permeable to hydrogen to separate a diffused pure hydrogen gas stream containing from 20 to 90% of the hydrogen in said gaseous mixture, controlling the amount of hydrogen so separated to provide an undiffused gas stream containing residual hydrogen and other combustible products of the reforming reaction in an amount sufficient to provide, on combustion, the heat required for maintaining the reforming reaction in said reforming reaction zone, admixing said undiffused gas stream with sufficient oxygen-containing gas to effect substantially complete combustion thereof and effecting said combustion in a combustion zone in heat-interchange relationship with said reforming reaction zone whereby the resultant heat of combustion is substantially the sole source of heat for maintaining the temperature of said reforming catalyst at said elevated temperature.

2. The process of claim 1 wherein the steam and hydrocarbon mixture is contacted with a reforming catalyst at a temperature between about 1000° F. and about 1800° F. and a pressure between about 2 and about 100 atmospheres.

3. The process of claim 1 wherein combustion of said undiffused gas stream is effected by contacting said gas in admixture with oxygen with a platinum group metal combustion catalyst.

4. A process for the production of hydrogen which process comprises the steps of contacting a mixture of steam and hydrocarbon with a reforming catalyst at a temperature between about 1000° F. and about 1400° F. and a pressure in the range of about 2 to about 100 atmospheres to produce a gaseous mixture containing hydrogen and oxides of carbon, effecting said contacting in the reforming reaction zone of a reactor within which is disposed a diffusion chamber whose wall is a non-porous metal permeable to hydrogen, continuously removing from about 20 to about 90% of the hydrogen produced in said reforming reaction zone from within said diffusion chamber, controlling the amount of hydrogen so separated to provide an undiffused gas stream containing residual hydrogen and other combustible products of the reforming reaction in an amount sufficient to provide, on combustion, the heat required for maintaining the reforming reaction in said reforming reaction zone, admixing said undiffused gas stream with sufficient oxygen-containing gas to effect substantially complete combustion thereof and effecting said combustion in a combustion zone in heat-interchange relationship with said reforming reaction zone whereby the resultant heat of combustion is substantially the sole source of heat for maintaining the temperature of said reforming catalyst at a temperature above about 1000° F.

5. The process of claim 4 wherein said diffusion chamber wall is composed of a material selected from the group consisting of palladium and palladium alloys.

6. The process of claim 4 wherein steam is employed in a ratio from about 1 to about 10 moles per atom of carbon in the hydrocarbon.

7. The process of claim 4 wherein steam is employed in a ratio from about 1.5 to about 4 moles per atom of carbon in the hydrocarbon.

References Cited by the Examiner

UNITED STATES PATENTS

| | | | |
|---|---|---|---|
| 411,426 | 9/1889 | Dahl | 136—86 |
| 1,124,347 | 1/1915 | Snelling | 23—212 X |
| 1,799,452 | 4/1931 | Beekley | 23—212 |
| 1,951,280 | 3/1934 | Hale et al. | 23—288 X |
| 1,960,912 | 5/1934 | Larson | 23—212 |
| 2,637,625 | 5/1953 | Garbo | 23—213 X |
| 3,002,039 | 9/1961 | Bacon | 136—86 |
| 3,198,604 | 8/1965 | Pfefferle | 23—212 |

FOREIGN PATENTS 579,535   7/1959   Canada.

OSCAR R. VERTIZ, *Primary Examiner.*

MAURICE A. BRINDISI, BENJAMIN HENKIN,
*Examiners.*

A. J. STEWART, B. H. LEVENSON,
*Assistant Examiners.*